(12) United States Patent
Barthelme et al.

(10) Patent No.: US 11,892,034 B2
(45) Date of Patent: Feb. 6, 2024

(54) NON-LOCATING BEARING ASSEMBLY

(71) Applicant: AKTIEBOLAGET SKF, Gothenburg (SE)

(72) Inventors: Juergen Barthelme, Grettstadt (DE); Helmut Hauck, Euerbach (DE); Stefanie Seufert, Rothhausen (DE); Alexander Dilje, Schweinfurt (DE); Hans-Juergen Friedrich, Königsberg-Römershofen (DE); Sebastian Kraus, Schwanfeld (DE); Andreas Herbert Kraus, Bergrheinfeld (DE); Berthold Beyfuss, Wasserlosen-Kaisten (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/824,932

(22) Filed: May 26, 2022

(65) Prior Publication Data
US 2022/0389957 A1 Dec. 8, 2022

(30) Foreign Application Priority Data
Jun. 8, 2021 (DE) .......................... 102021205781.0

(51) Int. Cl.
*F16C 23/08* (2006.01)
*F16C 25/08* (2006.01)

(52) U.S. Cl.
CPC ............ *F16C 23/08* (2013.01); *F16C 25/083* (2013.01)

(58) Field of Classification Search
CPC ........ F16C 23/08; F16C 25/08; F16C 25/083; F16C 27/04; F16C 35/077
See application file for complete search history.

(56) References Cited

U.S. PATENT DOCUMENTS

| | | | | |
|---|---|---|---|---|
| 5,899,574 A | * | 5/1999 | Chujo | F16C 25/083 384/906 |
| 8,303,188 B2 | * | 11/2012 | Otsuka | F16C 35/067 384/537 |
| 8,388,232 B2 | * | 3/2013 | Lida | F16C 27/066 277/641 |
| 9,702,403 B2 | * | 7/2017 | Beck | F16C 27/04 |
| 10,641,322 B2 | * | 5/2020 | Isaji | H02K 5/1732 |
| 10,910,911 B2 | * | 2/2021 | Shirai | H02K 7/116 |
| 2009/0080823 A1 | * | 3/2009 | Bauch | F16C 27/04 384/518 |
| 2022/0389955 A1 | * | 12/2022 | Kraus | F16C 25/083 |
| 2022/0389956 A1 | * | 12/2022 | Barthelme | F16C 35/077 |

* cited by examiner

*Primary Examiner* — James Pilkington
(74) *Attorney, Agent, or Firm* — J-TEK LAW PLLC; Scott T. Wakeman; Mark A. Ussai

(57) ABSTRACT

A non-locating bearing assembly includes a bearing unit configured to support a rotating component relative to a stationary component, and the bearing unit includes a first stationary bearing ring and a second rotatable bearing ring that is fixedly connectable to the rotating component. The assembly also includes a bearing carrier to which the stationary bearing ring is attached in a rotationally fixed but axially displaceable manner, and the bearing carrier is configured to be fixedly connected to the stationary component.

3 Claims, 3 Drawing Sheets

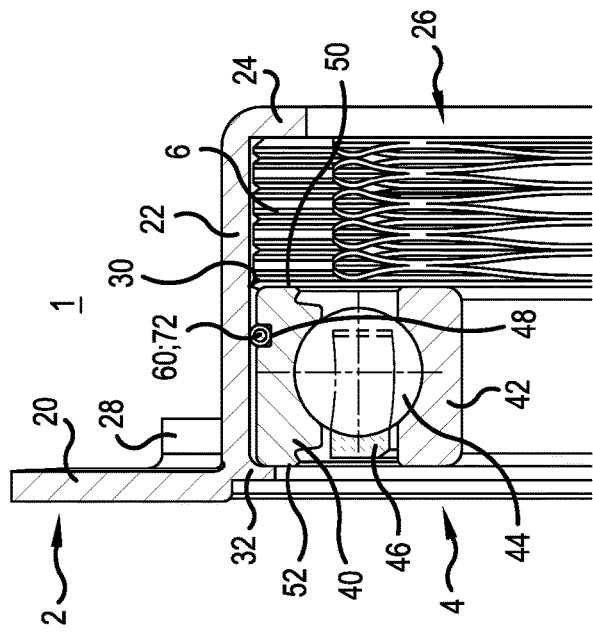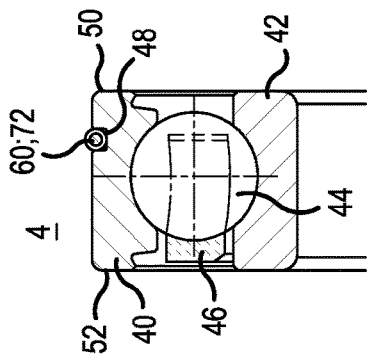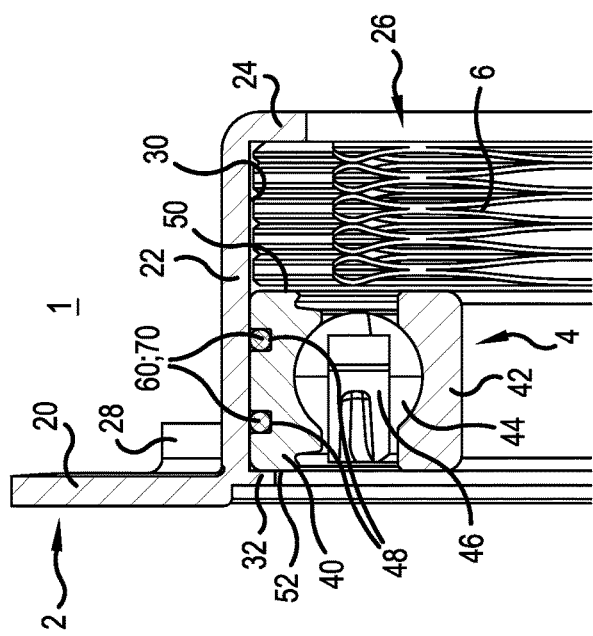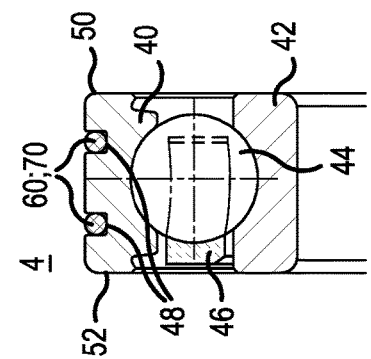

NON-LOCATING BEARING ASSEMBLY

CROSS-REFERENCE

This application claims priority to German patent application no. 10 2021 205 781.0 filed on Jun. 8, 2021, the contents of which are fully incorporated herein by reference.

TECHNOLOGICAL FIELD

The present disclosure is directed to a non-locating bearing assembly that includes a bearing carrier for supporting a bearing ring in an axially displaceable and substantially rotationally fixed manner.

BACKGROUND

Non-locating bearing assemblies are always used when a stationary bearing ring of a bearing unit is to be supported for axial movement relative to a component receiving the bearing unit. Such an axial displacement is necessary in particular when different coefficient of thermal expansions prevail between the stationary component and the bearing. These different thermal expansions lead to a variable fit between stationary bearing ring and stationary component, which can lead to damage to the bearing or the stationary component when they are not compensated for.

The reason for this is that this variable fit causes the bearing ring that is supposed to be stationary to co-rotate with the rotating bearing ring. This creeping or co-rotation of the stationary bearing ring then leads to damage to the bearing and must therefore be prevented.

It is also problematic that the variable fit can also lead to a blockage of the axial displaceability, which negatively influences or damages not only the bearing, but the entire component to which the non-locating bearing assembly is attached.

In order to in particular counter the different thermal expansions, in the prior art it has been proposed to provide the stationary component with a so-called inlay that has the same thermal expansion properties as the stationary bearing ring. Thus it has been proposed in particular to introduce a steel ring between the bearing ring and the stationary component, which steel ring, however, can be introduced into the stationary component only at high expense, such as, for example, by welding, soldering, adhering, screwing, or in-situ injecting. In addition, this ring must subsequently be machined and matched to all individual elements so that the tolerances of all elements can be set. However, this requires a very high installation expense, which in turn leads to high costs.

SUMMARY

An aspect of the present disclosure is therefore to provide a non-locating bearing assembly that provides a rotational securing, an axial clearance reduction, and a temperature expansion compensation, and that is simple to install.

In the following a non-locating bearing assembly including a bearing unit is disclosed that is configured to support a rotating component relative to a stationary component and includes a first stationary bearing ring and a second rotatable bearing ring. Here the rotating bearing ring is fixedly connectable to the rotating component. Such a fixed connectability can be brought about by snap rings or a press fit.

In order to make possible a simplest-possible installation of the non-locating bearing assembly on the stationary component, the non-locating bearing assembly furthermore includes a bearing carrier that is fixedly connectable to the stationary component. The stationary bearing ring is mounted in the bearing carrier such that it essentially does not rotate but such that it is axially displaceable. It is advantageous here in particular when the non-locating bearing assembly is provided as a preinstalled unit made of a bearing carrier and a bearing unit. The entire non-locating bearing assembly can thereby easily be attached to the stationary component without the tolerances of the individual components having to be set separately and laboriously during installation.

This is advantageous in particular when not only a bearing unit, but further elements such as, for example, a spring element, are disposed in the non-locating bearing assembly. Such a spring element is provided, for example, to interact with the bearing carrier and the stationary bearing ring so that the axially displaceable stationary bearing ring is axially preloaded in the bearing carrier. Of course, however, it is also possible to provide a bearing carrier including a non-locating bearing assembly disposed therein, in which no preinstalled unit is present, but rather wherein the bearing carrier is merely configured to receive the spring element, and the spring element preloads the stationary bearing ring only in the installed assembly situation.

According to a further advantageous exemplary embodiment, the bearing carrier furthermore includes a stop element that interacts with the spring element or the bearing ring in order to limit axial movement of the bearing ring. This is advantageous in particular for a preinstalled unit made of a bearing carrier and a bearing ring since the stop element simultaneously prevents the bearing unit from falling out. In addition, using the defined stop element, the preload of the non-locating bearing assembly can be preset during manufacturing so that a laborious adapting of the tolerances and preloads during installation can be omitted.

The bearing carrier and bearing unit are preferably manufactured from the same material, but it is also possible that they are manufactured from different materials, wherein, however, it is preferable to use materials that have similar coefficients of thermal expansions. The same thermal expansion conditions thereby prevail between the bearing carrier and the stationary bearing ring so that fit difficulties between the bearing carrier and the stationary bearing ring are prevented due to identical thermal expansions.

The bearing carrier itself can essentially be configured pot-shaped and include a flange configured as a pot rim that includes at least one attachment element by which the bearing carrier is attachable to the stationary component. A particularly simple and fast installation of the non-locating bearing assembly, and in particular of the bearing carrier on the stationary component, is thereby possible. Depending on the design of the stationary component, of course, the pot base can also be configured as a flange and be connectable to the stationary component.

In order to make possible a rotationally fixed but axially displaceable attaching of the stationary bearing ring into the bearing carrier, the stationary bearing ring is attached to the bearing carrier using a friction-fit. This makes possible a particularly simple and cost-effective attaching of the bearing unit to the bearing carrier.

The friction-fit connection can, as a further preferred exemplary embodiment shows, be produced by at least one connecting element that interacts in a friction-fit manner with an abutment surface formed on the bearing ring and/or with a surface of the bearing carrier configured as abutment surface.

Even if in principle the stationary bearing ring itself could be attached to the bearing carrier in a friction-fit manner, the providing of a connecting element is still preferred. A higher friction force on the corresponding abutment surfaces can advantageously be exerted via the additional connecting element so that the bearing ring is fixedly attached in the bearing carrier in the circumferential direction. The additional connecting element also prevents noise, for example a rattling, between bearing ring and bearing carrier.

According to a further preferred exemplary embodiment, the stationary bearing ring and/or the abutment surface of the bearing carrier includes at least one groove in which the connecting element, which abuts against the abutment surface of the bearing carrier and/or of the bearing ring in a friction-fit manner, is disposed so that the stationary bearing ring is attached in the bearing carrier in a friction-fit manner and such that they are rotationally fixed. Providing the groove ensures that, with axial movement of the bearing ring relative to the bearing carrier, the connecting element is not changed in its position. In addition, the contact of the connecting element against the groove walls increases the friction fit between connecting element and receiving component so that even with high rotational forces the bearing ring is attached in the bearing carrier such that they are rotationally fixed.

Here the connecting element can additionally be attached in the groove in a materially bonded manner, in particular by adhering, which increases the friction fit in the circumferential direction still further. Of course, a connecting element adhered in this way is also possible in an exemplary embodiment without a groove, wherein the connecting element is only adhered to the abutment surface of the bearing ring or of the bearing carrier so that with respect to one of the elements the friction fit, and also the friction fit in the circumferential direction, and also in the axial direction, is increased.

According to a further advantageous exemplary embodiment, the connecting element is an elastomer ring. Elastomer rings are relatively cost-effective and can easily be introduced between the bearing ring and the bearing carrier, or be inserted into the groove. They can also provide a sufficient friction force in the circumferential direction so that the bearing ring is attached in the bearing carrier such that they are rotationally fixed.

According to a further preferred exemplary embodiment, the connecting element is configured as a plastic element that is injected into the groove. Here as plastic an elastomer plastic can in particular be used that forms a particularly high friction in the groove and with the abutment surface opposite the groove. Due to the injecting into the groove, the friction fit of the plastic element in the groove is also increased, since during the injecting of the plastic, irregularities in the groove are filled in which increases the friction of the plastic element in the groove. It can thereby be ensured in particular that the connecting element is disposed in the groove such that they are rotationally fixed.

According to a further advantageous exemplary embodiment, the connecting element is configured as a spring element that exerts a radial contact force on the abutment surface of the bearing carrier and/or of the bearing ring such that the stationary bearing ring is attached in the bearing carrier in a friction-fit manner and such that they are rotationally fixed. This radial contact force also increases the friction on the corresponding abutment surface so that even with high load in the circumferential direction, the bearing ring is attached in the bearing carrier such that they are rotationally fixed.

It is advantageous here in particular when the spring element is a worm spring. Such springs can be easily inserted into a groove and act similarly to the above-discussed elastomer ring. In addition, here the friction is increased due to the windings of the worm spring, which interact with irregularities on the bearing carrier or on the abutment surface, and thus increase the friction fit.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 1 is a sectional side elevational view of a non-locating bearing assembly including a bearing and a bearing carrier according to a first embodiment of the disclosure.

FIG. 2 is a sectional side elevational view of the bearing of FIG. 1.

FIG. 3 is a sectional side elevational view of a non-locating bearing assembly including a bearing and a bearing carrier according to a second embodiment of the disclosure.

FIG. 4 is a sectional side elevational view of the bearing of FIG. 3.

DETAILED DESCRIPTION

In the following, identical or functionally equivalent elements are designated by the same reference numbers.

The appended Figures show preferred exemplary embodiments of a non-locating bearing assembly 1 including a bearing carrier 2 in which a bearing unit 4 and a spring element 6 are disposed. The exemplary embodiments depicted show a non-locating bearing assembly 1 that can be used, for example, for supporting a shaft in a housing, wherein the housing is stationary and the shaft is rotating. Of course, the non-locating bearing assembly 1 is also usable in other applications, for example, a stationary pin and a rotating housing.

It is advantageous here in particular when the bearing carrier 2 and the bearing unit 4 are manufactured from the same material or at least from materials having identical or similar coefficient of thermal expansions. Fit changes in operation can thereby be prevented.

Figure 6:
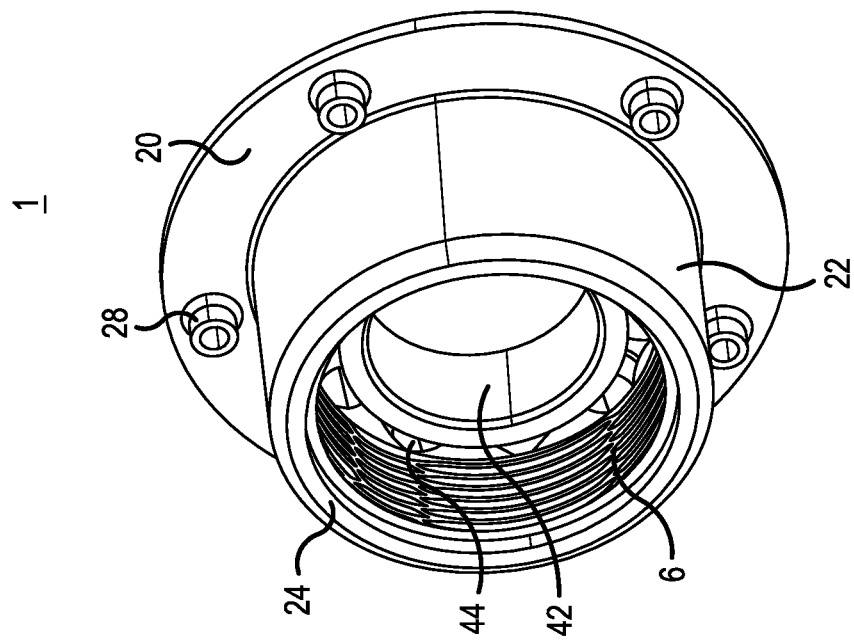
FIG. 6 is a perspective view of the non-locating bearing assembly of FIG. 2.
Figure 5:
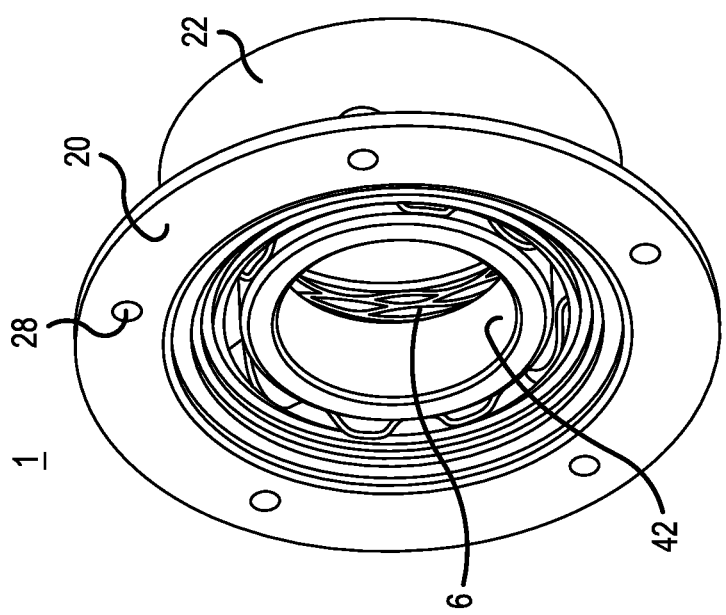
FIG. 5 is a perspective view of the non-locating bearing assembly of FIG. 1
Figure 7:
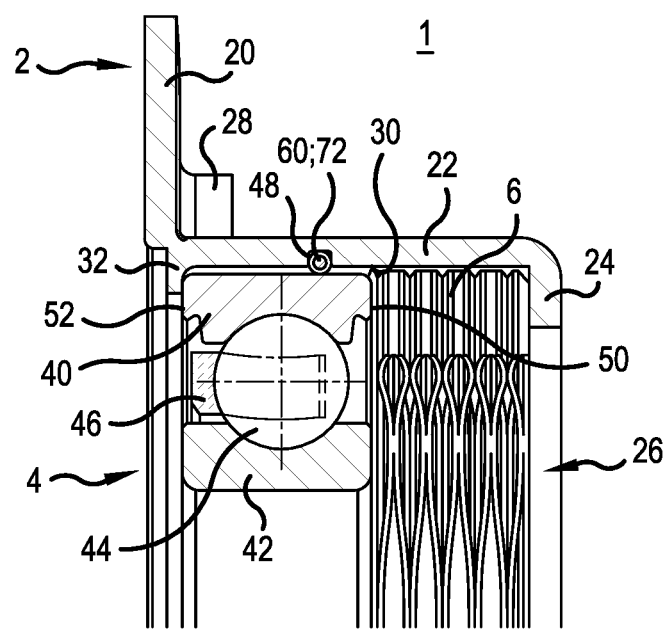
FIG. 7 is a sectional side elevational view of a non-locating bearing assembly including a bearing and a bearing carrier according to a third embodiment of the disclosure.

In the depicted exemplary embodiments, the bearing carrier 2 is configured pot-shaped and includes a pot rim configured as a flange 20, a pot wall 22, and a pot base 24, wherein the pot base 24 includes a large recess 26 in order to attach the non-locating bearing assembly 1 to the movable component (not depicted). Furthermore, the bearing carrier 2 includes attachment elements 28 that are preferably disposed equally spaced along the flange 22. The attachment elements 28 can, as can be seen in particular from FIGS. 5 and 6, be configured as through-holes that are suitable for receiving screws. Of course, other attachment elements are also possible.

The bearing unit 4 comprises a bearing outer ring 40 that is configured in the depicted exemplary embodiment as a stationary bearing ring and a bearing inner ring 42 that is rotatable here that are spaced with respect to each other and receive rolling elements 44 between them that are guided and held uniformly spaced by a cage 46. As mentioned above, the exemplary embodiments are suited in particular for a shaft bearing assembly in a housing wherein the outer ring is rotationally fixed but axially displaceable. However, it is equally possible to form the bearing inner ring axially displaceable. Such a design is advantageous in particular with rotating housings, such as, for example, a hollow shaft.

In the exemplary embodiments depicted the bearing unit is furthermore configured as a ball bearing, but all other types of rolling-element bearings and plain bearings are also possible.

Furthermore, it can be seen from the Figures that in addition to the bearing unit 4 a spring element 6 is also disposed in the bearing carrier 2. This spring element 6 ensures that the bearing outer ring 40 is preloaded in the bearing carrier 2. Here the spring element 6 is supported on one side on the pot base 24 of the bearing carrier 2 and on the other side is supported on an end side 50 of the bearing outer ring 40.

In order to in particular provide a preinstalled non-locating bearing assembly 1, the bearing carrier 2 can furthermore be equipped on the flange side with a stop 32 that contacts and supports the bearing outer ring 40 on its other end side 52. It is thereby also possible to arrange the bearing unit overall in an already preloaded rest position in the bearing carrier 2. At the same time the entire non-locating bearing assembly 1 can be attached to a stationary component without having to take account of tolerances so that a particularly simple installation is possible. A shaft spring made of a flat wire is preferably used as the spring element 6. However, every other type of spring element 6 is also equally possible, such as, for example, a plate spring.

As mentioned above, in the depicted exemplary embodiments of FIGS. 1 and 3, the non-locating bearing assembly is a non-locating bearing assembly in which the outer ring 40 is rotationally stationary but axially displaceable, while the bearing inner ring 42 is rotatably connectable to a shaft not depicted here. In contrast, the bearing carrier 2 that receives the bearing unit 4 is rotationally and axially fixed with respect to a housing (not depicted) in which the non-depicted shaft is supported.

In order to ensure the axial displaceability of the non-locating bearing assembly 1, in the depicted exemplary embodiments the bearing outer ring 40 includes one (FIG. 3, 4) or two (FIG. 1, 2) formed grooves in which a connecting element is disposed in an interference-fit manner, which prevents a movement of the bearing outer ring 40 in the circumferential direction but allows an axial movement. Of course, it is naturally also possible to provide the groove on the bearing carrier 2 and the abutment surface on the bearing outer ring 40. The bearing unit 4 is depicted enlarged in the detail view 2 and 4.

The connecting element 60 can be configured, as depicted in FIG. 2, as an elastomer ring 70 that is received in the grooves 48-1, 48-2 of the bearing outer ring. Here an elastomer ring 70 can be placed into the grooves 48 as a simple O-ring, but it is also possible to inject the elastomer material into the grooves 48, whereby the friction fit between elastomer ring 70 and groove 48 is increased. As indicated in FIG. 1, the elastomer rings 70 contact an inner surface 30 of the bearing carrier 2 and form a friction fit with it. Due to this friction fit the bearing outer ring 40 is secured against rotation in the bearing carrier 2.

By providing two or even more elastomer rings 70, the friction force and thus the rotational securing can be increased. Of course, it is also possible to receive different connecting elements 60 in the grooves.

The grooves 48 also have the advantage that with an axial displacement of the bearing ring 40 relative to the bearing carrier 2, the elastomer ring 70 or generally the connecting elements 60 are axially co-displaced without damage to the connecting elements 60.

Alternatively or additionally, the connecting element 60 or one of the connecting elements 60 can also be configured as a spring element 72, as is depicted in FIG. 3 and the detail view of FIG. 4. In the exemplary embodiment of FIGS. 3 and 4, only a spring element 72 is provided in the form of a worm spring that exerts a spring force acting radially outwardly on the abutment surface 30 of the bearing carrier 2, whereby the friction force of the connecting element 60 against the abutment surface 30 is also increased. The use of a worm spring 72 also has the advantage that the windings of the worm spring 72 can engage into irregularities on the abutment surface 30 of the bearing carrier 2, so that the friction fit is also thereby increased.

Overall, using the proposed non-locating bearing assembly 1 a simple-to-handle unit can be provided that can be directly installed in its entirety without having to take account of tolerances of the housing, shaft, bearing, snap ring, elastomer ring, and spring. The usability of an entirely preassembled unit also reduces the installation time and thus installation costs. Since bearing carrier 2 and bearing unit 4 are manufactured from the same material, or from materials that thermally expand in a similar manner, a drastic reduction of the negative influence of different temperature-dependent expansions of bearings and light metal of a housing can be achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved non-locating bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Non-locating bearing assembly
2 Bearing carrier
20 Flange
22 Pot wall
24 Pot base
26 Recess
28 Attachment element
30 Abutment surface
32 Stop
4 Bearing unit
40 Bearing outer ring
42 Bearing inner ring
44 Rolling element
46 Cage
48 Groove
50; 52 End surfaces of the bearing ring
60 Connecting element
70 Elastomer ring
72 Worm spring

What is claimed is:

1. A non-locating bearing assembly comprising:
a bearing unit configured to support a rotatable component relative to a stationary component, the bearing unit including a first stationary bearing ring and a second rotatable bearing ring fixedly connectable to the rotatable component, and
a bearing carrier to which the stationary bearing ring is attached by a connector, the bearing carrier being configured to be fixedly connected to the stationary component,
wherein the stationary bearing ring or the carrier includes at least one circumferential groove and the connector includes a spring mounted in the circumferential groove and exerting a spring force radially outwardly against a surface of the carrier and/or radially inwardly against a surface of the stationary bearing ring and the spring has windings configured to engage with any irregularities in the surface of the carrier and/or the surface of the stationary bearing ring such that the connector allows axial displacement of the stationary bearing ring while at least resisting rotation of the stationary bearing ring, and wherein the bearing carrier includes stop elements configured to prevent axial separation of the stationary bearing ring and the bearing carrier.

2. The non-locating bearing assembly according to claim 1, wherein the non-locating bearing assembly is configured as a preinstalled unit including the bearing carrier and the bearing unit.

3. The non-locating bearing assembly according to claim 1,
including another spring mounted in the bearing carrier between the bearing carrier and the stationary bearing ring to preload the stationary bearing ring in the bearing carrier.

* * * * *